United States Patent
Joy et al.

(10) Patent No.: US 10,673,951 B2
(45) Date of Patent: Jun. 2, 2020

(54) MIGRATION BETWEEN DEVICE-MANAGEMENT SERVICES

(71) Applicant: VMWARE, INC., Palo Alto, CA (US)

(72) Inventors: Don Joy, Bangalore (IN); Gaurav Verma, Bangalore (IN); Suchit Shivashankar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 101 days.

(21) Appl. No.: 15/936,478

(22) Filed: Mar. 27, 2018

(65) Prior Publication Data

US 2019/0245928 A1 Aug. 8, 2019

(30) Foreign Application Priority Data

Feb. 5, 2018 (IN) .............................. 201841004290

(51) Int. Cl.
| | |
|---|---|
| *H04L 29/08* | (2006.01) |
| *H04W 4/08* | (2009.01) |
| *H04W 4/50* | (2018.01) |
| *H04L 12/24* | (2006.01) |

(52) U.S. Cl.
CPC .......... *H04L 67/125* (2013.01); *H04L 41/046* (2013.01); *H04L 41/0813* (2013.01); *H04L 41/0893* (2013.01); *H04L 67/025* (2013.01); *H04W 4/08* (2013.01); *H04W 4/50* (2018.02)

(58) Field of Classification Search
None
See application file for complete search history.

(56) References Cited

U.S. PATENT DOCUMENTS

| | | | |
|---|---|---|---|
| 2002/0049693 A1* | 4/2002 | Gase ................. | H04L 29/12216 |
| 2015/0113131 A1* | 4/2015 | Veenstra ............ | H04L 41/0803 |
| | | | 709/224 |

OTHER PUBLICATIONS

Amadeo, Ron in "A review of Android for Work: Dual persona support comes to Android". <https://arstechnica.com/information-technology/2015/03/a-review-of-android-for-work-dual-persona-support-comes-to-android/>. Mar. 26, 2015 (Year: 2015).*
"How to remove MDM from Android". <https://www.codeproof.com/blog/how-to-remove-mdm-from-android/>. May 20, 2016 (Year: 2016).*

\* cited by examiner

*Primary Examiner* — Scott B Christensen
(74) *Attorney, Agent, or Firm* — Clayton, McKay & Bailey, PC (57) ABSTRACT

Examples described herein include systems and methods for migrating a group of user devices associated with an enterprise from a first device-management service to a second device-management service. An example method can include receiving a request to migrate the group of user devices from the first device-management service to the second device-management service. The second device-management service can associate the enterprise support service with the second, rather than the first, device-management service. It can also cause the enterprise support service to install an agent application the user devices in the group. Finally, the second device-management service can remove one or more applications, associated with the first device-management service, from the user devices in the group.

17 Claims, 8 Drawing Sheets

MIGRATION BETWEEN DEVICE-MANAGEMENT SERVICES

RELATED APPLICATIONS

Benefit is claimed under 35 U.S.C. 119(a)-(d) to Foreign Application Serial No. 201841004290 filed in India entitled "MIGRATION BETWEEN DEVICE-MANAGEMENT SERVICES", on Feb. 5, 2018, by VMware, Inc., which is herein incorporated in its entirety by reference for all purposes.

BACKGROUND

Enterprises increasingly rely on Mobile Device Management ("MDM") or Enterprise Mobility Management ("EMM") providers to help manage devices for employees. Device-management systems allow an enterprise to exercise varying levels of control over devices, even where those devices are employee-owned. Enrolling a device into a device-management system can involve installing management software on the device that allows an administrator to monitor the device and enforce policies and compliance rules. Enrollment can also include leveraging EMM functionality built into an operating system ("OS") of a device.

For enterprises that wish to manage many devices, enrollment into a device-management system can be time consuming and sometimes requires employee participation. However, the difficulties of initial enrollment into a device-management system can pale in comparison to the difficulties of unenrolling from one management system and enrolling into another. Adding to this complexity is the integration of third-party enterprise services. For example, an EMM system can register with an enterprise service, such as GOOGLE's ANDROID FOR WORK, to leverage functionality specific to certain devices—such as devices running GOOGLE's ANDROID operating system. An enterprise using an EMM system integrated with an enterprise service such as ANDROID FOR WORK can be faced with an arduous process if it wishes to change to a new EMM system. Making this change can involve—for each device utilizing the enterprise service—manually unenrolling the device, manually downloading new management software on the device, and reenrolling the device into the new EMM system. In some unfortunate cases, each device must be factory reset in order to make the change.

The difficulties faced by an enterprise wishing to change to a new device-management service sometimes outweighs the potential benefits of making the change. As a result, a need exists for systems and methods for efficiently migrating a group of user devices, associated with an enterprise, from a first device-management service to a second device-management service.

SUMMARY

Examples described herein include systems and methods for migrating a group of user devices, associated with an enterprise, from a first device-management service to a second device-management service. As used herein, a "device-management service" can be any service, system, or provider that provides device-management functionality, such as an EMM system or EMM provider. The example systems and methods herein attempt to simplify or automate much of the migration process, easing the burden on an administrator that oversees device management for the enterprise.

An example method can include receiving a request to register with the second device-management service. This can happen by having an administrator, associated with the enterprise, login to a console associated with the second device-management service. The console can be a web portal, for example. This portion of the method can also occur after the administrator has unregistered an enterprise account associated with an enterprise support service (also referred to herein as an enterprise service).

An enterprise support service can be any service, system, or provider that provides enterprise support features. In some examples, an enterprise support service is also a device-management service or EMM provider. In other examples, an enterprise support service provides only some functionality of a full-fledged EMM provider. In one example, GOOGLE is an enterprise support service that provides enterprise services such as ANDROID FOR WORK. The services allow a device using an ADROID operating system to register with GOOGLE and allow an EMM provider to enforce management policies and compliance rules at the device. The EMM provider can register an administrator account with the enterprise support service, allowing the administrator to push profiles to large groups of devices under management.

Unregistering the enterprise account associated with the enterprise support service does not necessarily unenroll the devices associated with that enterprise. In some cases, the devices stay enrolled for a predetermined period of time, or until management software is deleted from the device.

At the console of the second device-management service, the administrator can select an appropriate option for configuring enrollment. For example, if the enterprise was using ANDROID FOR WORK in conjunction with the first device-management service, the administrator can select an option that allows for migrating the ANDROID FOR WORK devices and settings over to the second device-management service.

The administrator can also use the console to register the second device-management service with the enterprise support service. This can be done by, for example, providing the login credentials for the administrator's enterprise account associated with the enterprise support service. The second device-management service can use these credentials to access the enterprise support service for a variety of purposes. For example, the second device-management service can retrieve settings from the enterprise support service, including server settings and an Enterprise ID associated with the enterprise.

The second device-management system can also request and receive user details from the enterprise support service. For example, the console can make one or more Application Programming Interface ("API") calls to a server associated with the enterprise support service, requesting the user details. The user details can include, for example, a User ID, Device ID, user name, user email, and user password for each device to be enrolled. The user details can be saved at a migration server. In some examples, the user details can also be saved in a database. The second device-management service can also add a new data field for each device for which user details are saved in the migration server, where the new data field indicates whether the migration has been completed for that device.

The second device-management system can then instruct the enterprise support service, with which the enterprise's devices are still enrolled, to cause a management application to be installed on those enrolled devices. The management application, also referred to herein as an "agent application,"

can be an application associated with the second device-management system. An example management application is AIRWATCH AGENT. In some examples, after installation of the management application, the application needs to be manually launched by a user in order to perform additional functions. In those examples, the administrator can instruct the users to launch the application using any desired method.

After the management application is fully functional on a user device, the management application can take steps to enroll the device into the second device-management service. For example, the management application can detect if a work profile is present on the device and send an enrollment request to the migration server. The request can include information about the device, such as the device serial number or International Mobile Equipment Identity ("IMEI"). If the migration server has sufficient information about the device, it can respond and allow enrollment to proceed. The migration server can also check the database to confirm that the saved user details match the device information received in the request. The response from the migration server back to the device can provide instructions for enrollment, including a Uniform Resource Locator ("URL") associated with a management server of the second device-management service.

After enrollment is successfully completed into the second device-management service, the management application can cause the device to unenroll from the first device-management service. For example, the device can uninstall any other management applications stored on the device, along with any associated data such as profiles.

The example summarized above can be incorporated into a non-transitory, computer-readable medium having instructions that, when executed by a processor associated with a computing device, cause the processor to perform stages for migrating a group of user devices, associated with an enterprise, from a first device-management service to a second device-management service. Additionally, the example methods summarized above can be implemented in a system including, for example, a computing device, a device-management service, a migration server, a console, or any combination thereof.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for migrating a group of user devices associated with an enterprise from a first device-management service (the previous EMM provider) to a second device-management service (the new EMM provider). An example method can include receiving a request to migrate the group of user devices from the first device-management service to the second device-management service. The second device-management service can associate the enterprise support service with the second, rather than the first, device-management service. It can also cause the enterprise support service to install an agent application the user devices in the group. Finally, the second device-management service can remove one or more applications, associated with the first device-management service, from the user devices in the group.

FIGS. 1-4 provide flowcharts of example methods for migrating a group of user devices associated with an enterprise and utilizing an enterprise support service, from a first device-management service to a second device-management service. FIG. 5 provides an illustration of example system components for performing the various methods described herein. FIGS. 6A-6G provide illustrations of various portions of an exemplary method for migrating a group of user devices from one device-management service to another Turning to FIG. 1, an example method for migrating a group of user devices is shown. An enterprise is free to choose from a variety of device-management services—also referred to herein as EMM providers. The example method of FIG. 1 presumes that an enterprise previously used a first device-management service (or "old EMM provider") and wishes to migrate devices to a second device-management service (or "new EMM provider"). However, the enterprise need not have used a first device-management service. Instead, the enterprise may be set up to use an enterprise support service without also using a device-management service.

Figure 1:
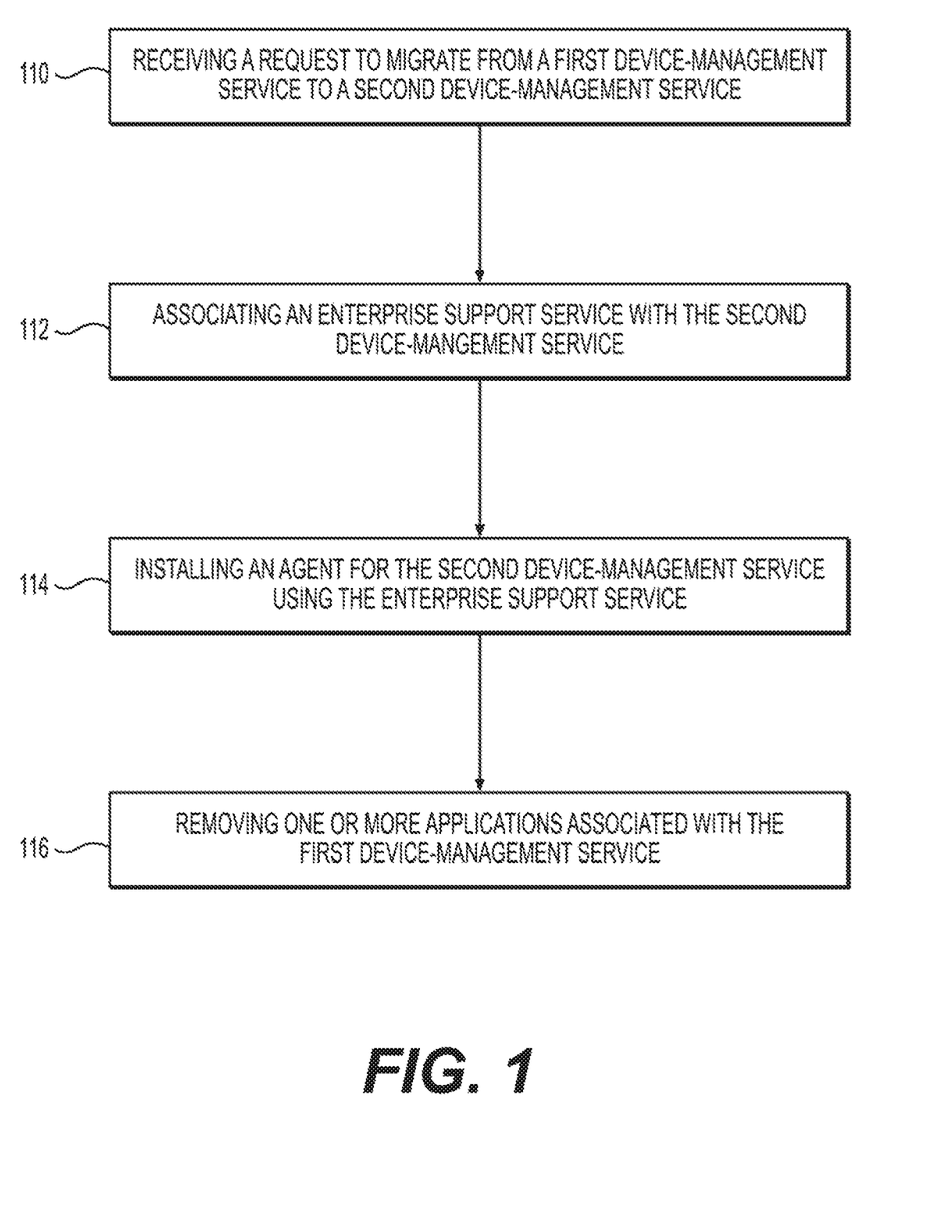
FIG. 1 is a flowchart of an exemplary method for migrating a group of user devices associated with an enterprise from a first device-management service to a second device-management service.

The example method of FIG. 1 therefore also presumes that the enterprise or the first device-management service utilized an enterprise support service in conjunction with at least some of the devices associated with the enterprise. This is described in more detail with respect to FIG. 6A, for example. An enterprise support service can provide at least some functionality of an EMM provider that allows the EMM provider to manage certain devices. For example, GOOGLE can be considered an enterprise support service that provides enterprise support services through its ANDRIOD operating system (the services sometimes referred to as ANDRIOD FOR WORK). This can allow a device-management service to manage certain devices by leveraging the functionality of the enterprise support service. For example, a device-management service can instruct the enterprise support service to enforce a particular compliance rule or policy on certain devices, and the enterprise support service can handle the enforcement procedures.

When an enterprise wishes to migrate their managed devices from the first device-management service to a new device-management service, the stages of FIG. 1 can be performed. Stage 110 of the example method can include receiving a request to register with a new device-management service. This stage can include receiving a registration request from an administrator associated with the enterprise. The stage can also include choosing administrator login credentials, choosing a type of management plan, and configuring options specific to the enterprise. This stage can be accomplished at a console or web portal associated with the new device-management service.

The administrator can indicate, during or after this process, that one or more devices managed by the enterprise are associated with an enterprise support service, such as GOOGLE. For example, the administrator can select an option indicating that a group of devices currently use ANDRIOD FOR WORK or some other enterprise support service. In response to this selection, the new device-management service can request information regarding the administrator account (or "enterprise account") associated with the enterprise support service.

Stage 112 can include associating an enterprise support service with the new device-management service, rather than the old device-management service. This process can be automated by the new device-management service. For example, upon receiving a selection that the group of devices use the enterprise support service and receiving the login credentials for the enterprise support service, a back-end process of the new device-management service can contact the enterprise support service, provide login credentials to access the enterprise account, and then configure the settings of the account such that the account becomes associated with the new device-management service. For example, the enterprise account can be associated with an Enterprise ID associated with the new device-management service. This can provide the new device-management service with full access to the enterprise support service.

Stage 114 can include installing an agent for the second device-management service using the enterprise support service. The new device-management service can cause an agent application to be installed on one or more devices that are being migrated from the old device-management service to the new device-management service. An agent application (which can also be referred to as a "management agent") can be an application, installed on a user device, that allows an enterprise to manage functional aspects of the device. The enterprise can manage these functions by configuring policies and compliance rules at a management server. The management server can provide the policies and compliance rules to the device to be enforced by the management agent. If policies or compliance rules are not followed, the management server can cause the management agent to take remedial actions with the device, such as by restricting access or wiping data from the device.

Causing the agent application to be installed on the user devices can include sending an instruction, from a server or console associated with the new device-management service, to the enterprise support service. The enterprise support service can then instruct the devices to download and install the agent application. In the example of GOOGLE as the enterprise support service, the enterprise account can be linked to GOOGLE's online store for enterprise management applications, such as GOOGLE PLAY FOR WORK. The account can be associated with a single Enterprise ID that includes multiple devices under management. Each of those devices can include a GOOGLE Device ID and User ID generated based on enrolling those devices with GOOGLE as the enterprise support service. The instruction from the new device-management service can instruct GOOGLE to install the agent through the GOOGLE PLAY FOR WORK store. The instruction can also instruct GOOGLE to push the agent installation to all devices associated with the Enterprise ID identified by a Device ID or User ID.

This process can take place in the background of the devices, without requiring user input. Upon successful installation, the enterprise support service can confirm with the new device-management service that the agent application has been installed on the devices. The enterprise support service can also identify the particular devices upon which the agent application is installed.

The agent application can be used for initial enrollment of a user device with the new device-management service. In some examples, the agent application can begin initial enrollment without user input. For example, the operating system of a device can give the agent application permission to begin initial enrollment immediately after installation on a device. In other examples, the agent application must be manually launched or otherwise initiated by a user in order to begin the enrollment process. In those examples, an administrator of the enterprise can provide instructions for the users to launch the application. This can be accomplished in any suitable manner, such as by sending an email, SMS, MMS, or other direct message to each user. In another example, the administrator can cause the enterprise support service to display a message on a user interface of the device. The agent application can request enrollment with the migration server after being launched. In some examples, the agent application can require additional user input before requesting enrollment.

Stage 116 can include removing one or more applications associated with the first device-management service. For example, the new EMM provider can instruct the device, through the agent application, to delete any applications associated with a previous EMM provider. The deletion can be performed in response to a success message sent in response to successful enrollment with the second device-management service.

Figure 2:
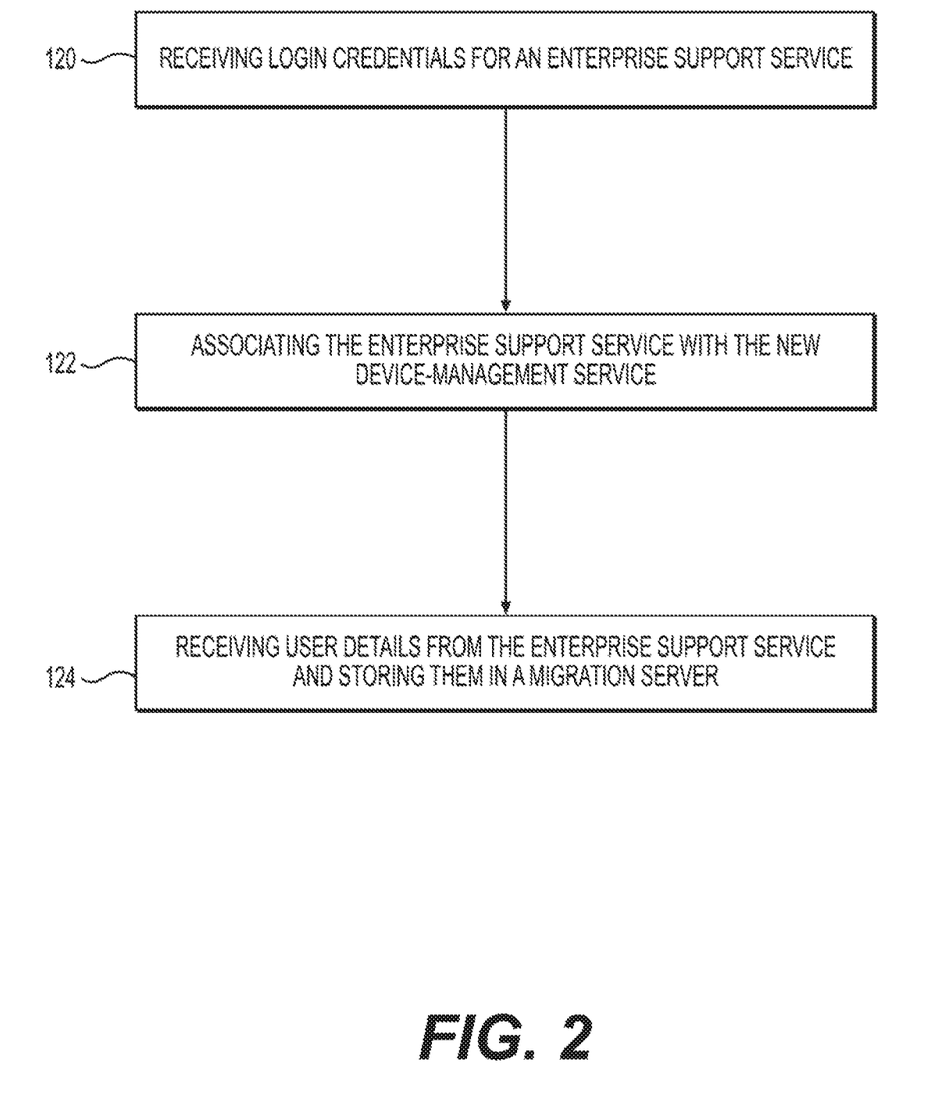
FIG. 2 is a flowchart of an exemplary method for migrating a group of user devices associated with an enterprise from a first device-management service to a second device-management service.

FIG. 2 provides an example method for migrating a group of user devices, with a focus on associating the enterprise support service with the second device-management service. At stage 120, the second device-management service can receive login credentials for the enterprise support service. This can include, for example, providing the login credentials for the administrator's enterprise account associated with the enterprise support service. The second device-management service can use these credentials to access the enterprise support service for a variety of purposes. The credentials can be provided at a console associated with the second device-management service.

Stage 122 can include associating the enterprise support service with the second device-management service. This stage can include utilizing the login credentials to access the administrator's enterprise account. The process can be performed manually, by an administrator, or automatically. For example, upon receiving a selection that the group of devices use the enterprise support service and receiving the login credentials for the enterprise support service, a backend process of the second device-management service can contact the enterprise support service, provide login credentials to access the enterprise account, and then configure the settings of the account such that the account becomes associated with the second device-management service. For example, the enterprise account can be associated with an Enterprise ID associated with the second device-management service. This can provide the second device-management service with full access to the enterprise support service.

At stage 124, the new device-management service can receive user details from the enterprise support service. For example, it can request a list, spreadsheet, or other data including the user details. The user details can include information about the users associated with the enterprise support service, as well as any devices associated with those users. More specifically, the user details can include names, usernames, user emails, user credentials, device identification numbers, and any other information relevant to a user and stored by the enterprise support service. The user details can be received by the new device-management service and stored in a migration server at stage 140 of the method of FIG. 1. The user details can also be stored in a database separate from the migration server. The database can be accessible at a console associated with the new device-management service, for example. The user credentials can include passwords, certificates, HMAC tokens, SAML tokens, or other forms of credentials.

Figure 3:
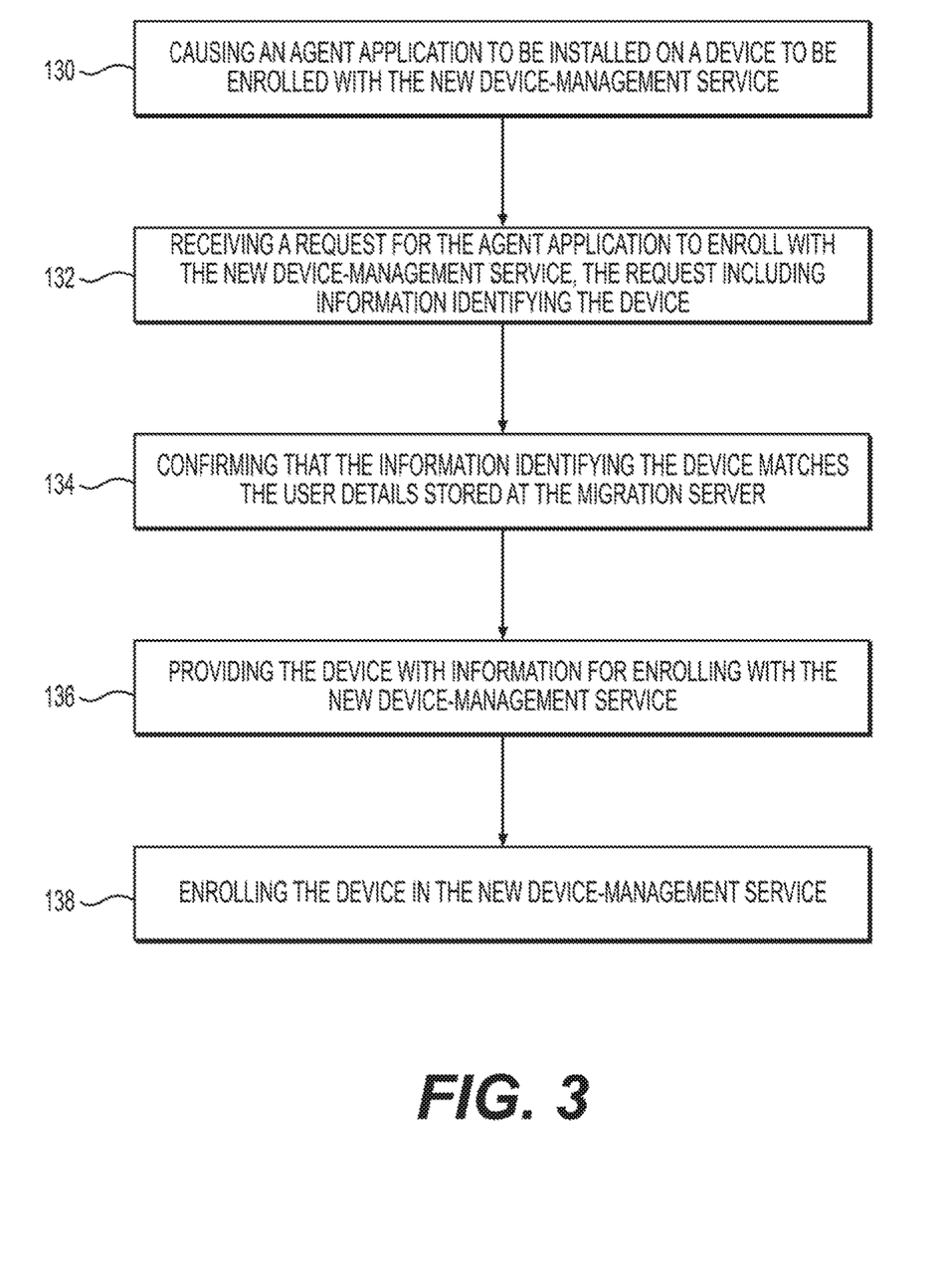
FIG. 3 is a flowchart of an exemplary method for migrating a group of user devices associated with an enterprise from a first device-management service to a second device-management service.

FIG. 3 provides an example method with additional details regarding migrating a group of user devices from a first device-management service to a second device-management service. Stage 130 can include installing an agent for the second device-management service using the enterprise support service. The new device-management service can cause an agent application to be installed on one or more devices that are being migrated from the old device-management service to the new device-management service. An agent application (which can also be referred to as a "management agent") can be an application, installed on a user device, that allows an enterprise to manage functional aspects of the device. The enterprise can manage these functions by configuring policies and compliance rules at a management server. The management server can provide the policies and compliance rules to the device to be enforced by the management agent. If policies or compliance rules are not followed, the management server can cause the management agent to take remedial actions with the device, such as by restricting access or wiping data from the device.

Causing the agent application to be installed on the user devices can include sending an instruction, from a server or console associated with the new device-management service, to the enterprise support service. The enterprise support service can then instruct the devices to download and install the agent application. In the example of GOOGLE as the enterprise support service, the enterprise account can be linked to GOOGLE's online store for enterprise management applications, such as GOOGLE PLAY FOR WORK. The account can be associated with a single Enterprise ID that includes multiple devices under management. Each of those devices can include a GOOGLE Device ID and User ID generated based on enrolling those devices with GOOGLE as the enterprise support service. The instruction from the new device-management service can instruct GOOGLE to install the agent through the GOOGLE PLAY FOR WORK store. The instruction can also instruct GOOGLE to push the agent installation to all devices associated with the Enterprise ID identified by a Device ID or User ID.

This process can take place in the background of the devices, without requiring user input. Upon successful installation, the enterprise support service can confirm with the new device-management service that the agent application has been installed on the devices. The enterprise support service can also identify the particular devices upon which the agent application is installed.

The agent application can be used for initial enrollment of a user device with the new device-management service. In some examples, the agent application can begin initial enrollment without user input. For example, the operating system of a device can give the agent application permission to begin initial enrollment immediately after installation on a device. In other examples, the agent application must be manually launched or otherwise initiated by a user in order to begin the enrollment process. In those examples, an administrator of the enterprise can provide instructions for the users to launch the application. This can be accomplished in any suitable manner, such as by sending an email, SMS, MMS, or other direct message to each user. In another example, the administrator can cause the enterprise support service to display a message on a user interface of the device. The agent application can request enrollment with the migration server after being launched. In some examples, the agent application can require additional user input before requesting enrollment.

Stage 132 can include receiving, at the migration server, a request for the agent application to enroll an associated device with the new device-management service. The request can include information identifying the requesting device, including a Device ID and any user details, such as a User ID, username, user email, user password, device manufacturer, and other device or user identification numbers. The migration server, in turn, can compare the information received at stage 132 to the information stored at the migration server at stage 124 of FIG. 2. Stage 134 of the method can include confirming that the information identifying the device matches the user details stored at the migration server for that device.

After confirming that the information matches, at stage 136 the new device-management service can provide the device with information for enrolling. For example, the new device-management service can provide an enrollment URL associated with a management server of the new device-management service. The agent application can access the enrollment URL and perform any required steps for enrolling the device at the management server at stage 138. When this process is completed, the device will be enrolled at the new device-management service, which can manage functionality of the device by leveraging the agent application as well as the enterprise support service.

Figure 4:
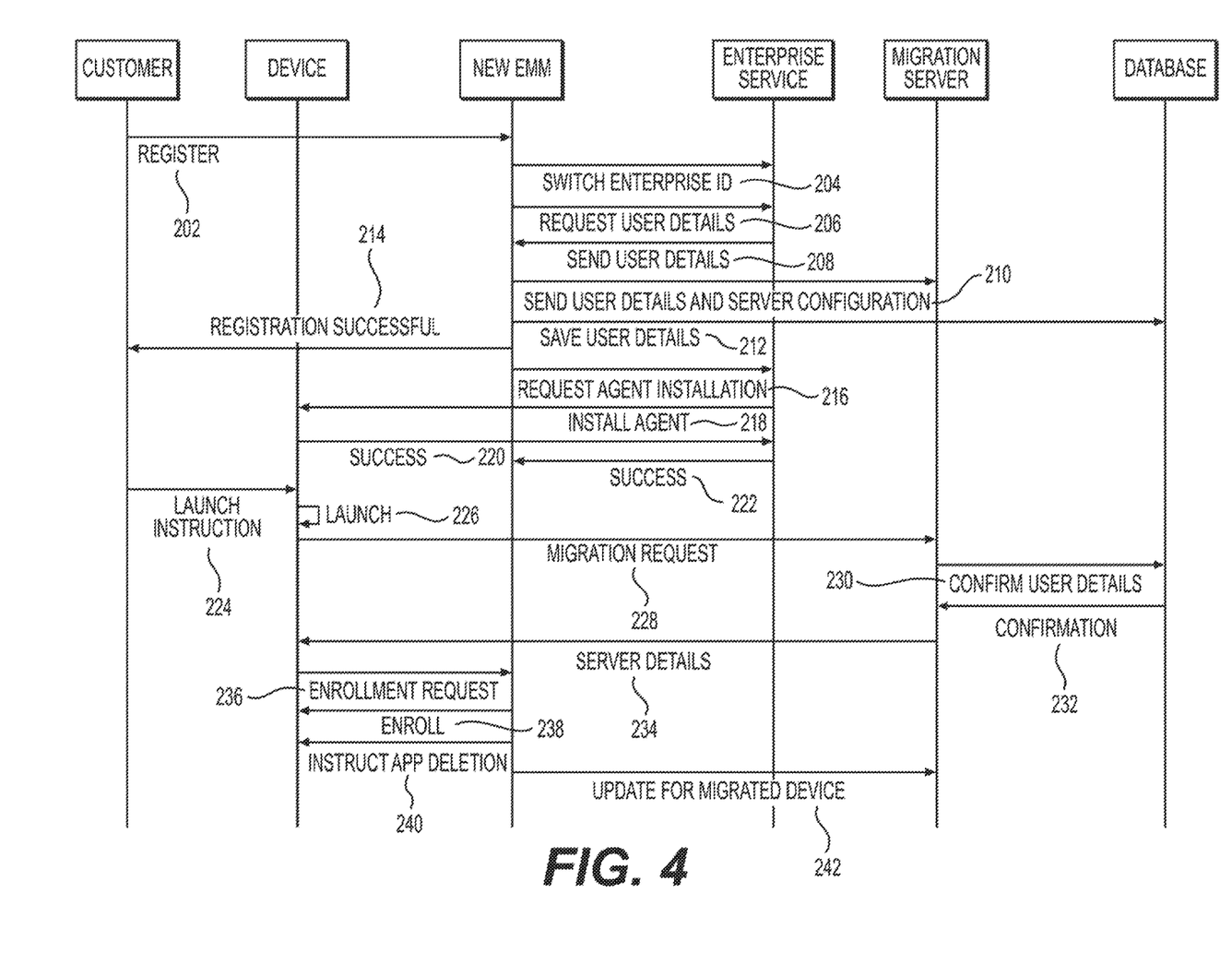
FIG. 4 is a flowchart of an exemplary method for migrating a group of user devices associated with an enterprise from a first device-management service to a second device-management service.
Figure 5:
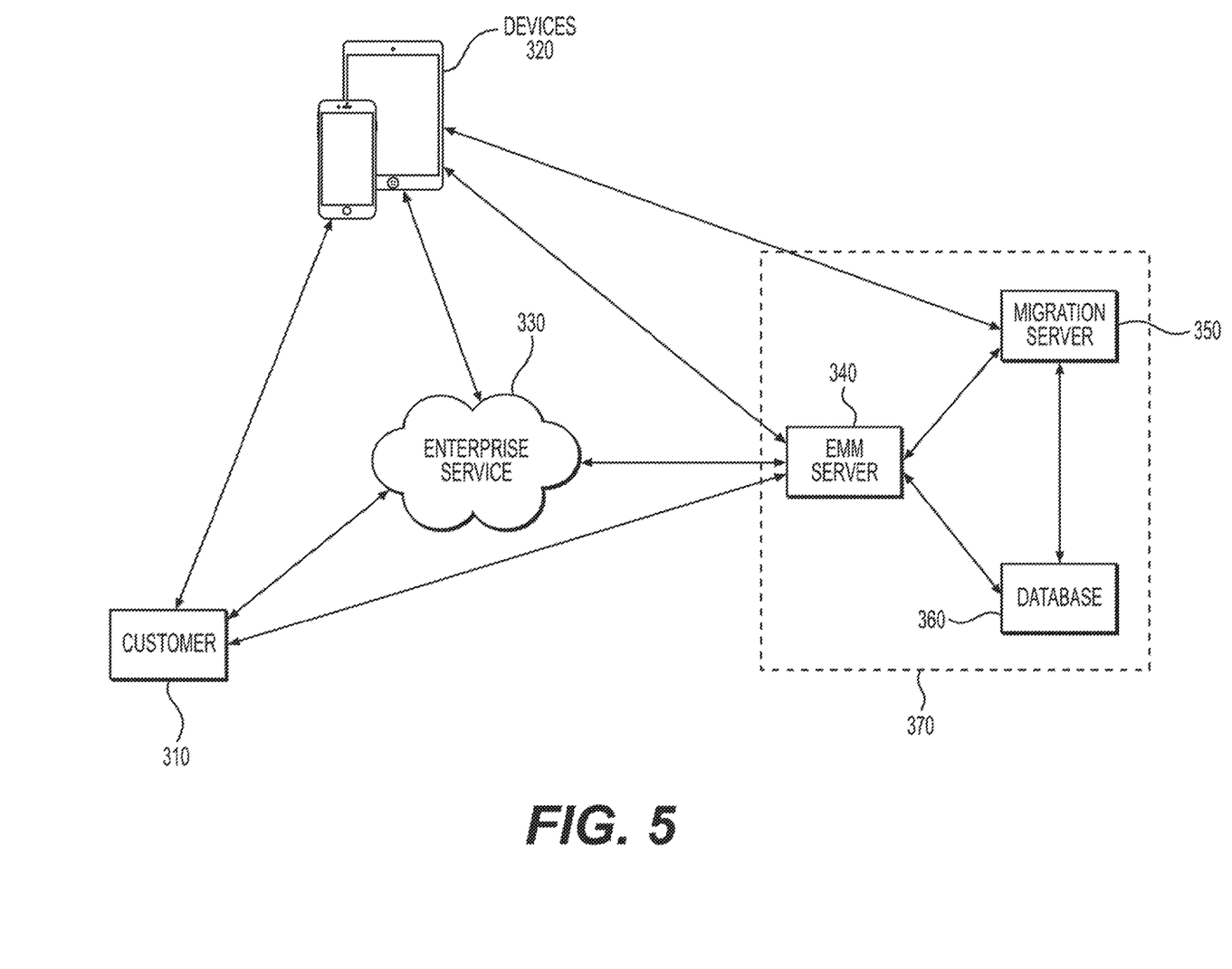
FIG. 5 is an exemplary illustration of system components for migrating a group of user devices associated with an enterprise from a first device-management service to a second device-management service.

FIG. 4 provides a flowchart of another example method for migrating a group of user devices associated with an enterprise and utilizing an enterprise support service, from a first device-management service to a second device-management service. In the example of FIG. 4, the second device-management service is labelled "new EMM" and the enterprise support service is labelled "enterprise service." Additionally, the enterprise seeking to migrate its users is labelled as "customer." These terms will be used in the description of FIG. 4 to remain consistent with the drawing. This choice of terms is not intended to be limiting in any way.

At stage 202, a customer requests registration at the new EMM provider. The customer can be an enterprise, company, association, or a representative or administrator of any of these entities. The customer can be utilizing an enterprise service, such as the enterprise support services described with respect to FIGS. 1-3. The customer can also be using another EMM provider in conjunction with the enterprise service. The request for registration at stage 202 can be made at a console or web portal associated with the new EMM provider. This stage can also include setting up a profile or account at the new EMM provider, including choosing login credentials, choosing a type of management plan, and configuring options specific to the customer.

Stage 202 can also include indicating that one or more customer devices are associated with the enterprise service. For example, the administrator can select an option at the new EMM provider's console indication that a group of customer devices use ANDRIOD, ANDRIOD FOR WORK, or some other enterprise support service. In response to this selection, the new EMM provider can request information regarding an enterprise account associated with the enterprise service, including the administrator's login credentials for the enterprise account. The administrator can provide these credentials as part of the registration process of stage 202.

At stage 204, the new EMM provider can configure the Enterprise ID associated with the enterprise service. This can occur as a backend process at a management server associated with the new EMM provider that utilizes the administrator's login credentials to log into the enterprise service and configure the Enterprise ID stored at the enterprise server to match the Enterprise ID of the new EMM provider. In another example, the backend process can create a new account with the enterprise service and identify the previous account using an Enterprise ID. In another example, the new EMM provider requests access to the enterprise service account and the enterprise service requires confirmation from the customer before providing access. These example processes can allow the new EMM provider to have full access to the enterprise service and provide instructions for the enterprise service to take actions with respect to the customer devices enrolled with the enterprise service.

The new EMM provider can request user details from the enterprise service at stage 206. For example, it can request a list, spreadsheet, or other data including the user details. In one example, it is a JSON file or XML file that is readable by the new EMM provider or migration server. The user details can include information about the users associated with the enterprise service, as well as any devices associated with those users. The user details can also include names, usernames, user emails, user credentials, device identification numbers, and any other information relevant to a user and stored by the enterprise service. This stage can also include requesting server details. The server details can include, for example, any server settings used by the enterprise service or old EMM provider. This can include file formats, information fields, network addresses, and authentication details such as the number and types of issued authentication tokens.

The user details and server details can be sent to the new EMM provider by the enterprise service at stage 208. Stages 206 and 208 can be performed by executing one or more API calls to the enterprise service. The new EMM provider, at stage 210, can save the user details and server details. In one example, these user and server details can be saved at a migration server. In some examples, the server details can be used to configure the migration server. The server details can also be used to configure a remote database. The user details and server details can also be saved in the remote database at stage 212. In some examples, only the user details are saved at the database.

At stage 214, the new EMM provider can indicate to the customer that the registration process has been successful. For example, a message can be displayed to the customer's administrator through the console or web portal of the new EMM provider. In some examples, the console or web portal provides the administrator with the option to provide an indication for the migration process to proceed. In other examples, the migration process proceeds automatically without any further input.

At stage 216, the new EMM provider send a request to the enterprise service, requesting the installation of an agent application on the devices to be migrated to and enrolled with the new EMM provider. This request can be a backend process that originates at the console or management server of the new EMM provider. The request can be routed directly to a server of the enterprise service, or can be routed to the enterprise service via a web portal of the enterprise service. As explained above with respect to FIG. 1, the agent application can be an application, installed on a user device, that allows the customer to manage functional aspects of the device. The enterprise can manage these functions by configuring policies and compliance rules at a console or management server.

The request can cause the enterprise service to install the agent application for all or some of the devices. Installation can be staged such that all devices do not install the agent application at the same time, in one example. The staging can be based on the user's position (e.g., their organizational group) within the enterprise. For example, a programmer can have a higher-priority need to install the agent application and begin using the EMM system relative to a customer-service representative. The administrator can therefore allow members of the programming organizational group to install the agent application before members of the customer service organizational group. This staging can mitigate server loads during the transition between EMM systems.

In response to the request at stage 216, the devices can download and install the agent application at stage 218. In the example of GOOGLE as the enterprise service, the instruction from the new device-management service can instruct GOOGLE to push the agent application through an ANDRIOD FOR WORK account. The account can include Device ID and User ID information for each device under management, and GOOGLE can push the agent application through the GOOGLE PLAY FOR WORK store, in an example. This process can take place in the background of the devices, without requiring user input. In another example, the enterprise service provisions the agent application directly to the devices. In yet another example, the enterprise service allows the management server of the new EMM provider to provision the agent application directly to the devices.

Upon successful installation, the device can report a successful installation to the enterprise service at stage 220, and the enterprise service can report a successful installation to the new EMM provider at stage 222. The report can include an identification of which particular devices have downloaded the agent application, as well as an indication of whether the application has been launched yet.

At stage 224, the customer can instruct users to launch the agent application. In some examples, this stage is unnecessary as the agent application can provide full functionality without a user manually launching it. However, if a manual launch is necessary, the customer can instruct the users to launch at stage 224. The instruction can come in any form, such as an email, SMS, MMS, or other direct message to each user. In another example, the administrator can cause the enterprise support service to display a message on a user interface of each device, instructing the user of the device to launch the agent application. In yet another example, the administrator requests the new EMM provider to send an email to the relevant users based on the email addresses received from the enterprise service. The device can launch the agent application at stage 226.

At stage 228, the device can send a migration or enrollment request to the migration server. The request can include information identifying the requesting device, including a Device ID and any user details, such as a User ID, username, user email, user password, device manufacturer, and other device or user identification numbers. The migration server can compare the information received at stage 228 to the information stored at the database at stage 212. Stage 230 of the method can include confirming that the information identifying the device matches the user details stored at the database for that device. A confirmation message can be sent from the database to the migration server at stage 232.

After confirming that the information matches, at stage 234 the migration server can provide server details to the device for enrollment. For example, the migration server can provide an enrollment URL associated with a management server of the new EMM provider. The agent application on the device can request enrollment at stage 236 and perform any steps required for enrollment at stage 238. After successful enrollment, at stage 240 the new EMM provider can instruct the device, through the agent application, to delete any applications associated with a previous EMM provider. The deletion can be performed in response to a success message sent in response to successful enrollment at stage 238. In addition, a message sent at stage 238 can include the instruction to delete any applications associated with the previous EMM provider.

At stage 242, the new EMM provider can update the migration server to reflect a completed migration of the device. This can include, for example, updating a "Migration" field at the server from "no" to "yes." This updated field can be stored at the database instead of, or in addition to, the migration server.

FIG. 5 provides an exemplary illustration of system components for migrating a group of user devices associated with an enterprise from a first device-management service to a second device-management service, including performing the methods of FIGS. 1-4. The system can include a customer 310, such as an enterprise, that includes various devices 320 assigned to members of the enterprise. The devices 320 can be employee-owned devices or employer-owned devices. A device 320 can include one or more processors, a memory store, and a display, and can connect to a wireless network.

In the example of FIG. 5, the devices 320 associated with the customer 310 are also associated with an enterprise service 330. The enterprise service 330 can be a service that provides management functionality, allowing the customer 310 to exercise some degree of management control over the devices 320. This management control can be used in conjunction with an EMM provider, which can leverage the enterprise service 320 to manage devices associated with the enterprise service 320. As an example, GOOGLE can be considered an enterprise service that provides enterprise support services through its ANDRIOD operating system (the services sometimes referred to as ANDRIOD FOR WORK). However, the enterprise service 330 is not limited to any particular service, company, operating system, or manufacturer.

The example of FIG. 5 also includes an EMM system 370 that includes various components. If the devices 320 are currently enrolled with a first EMM provider (or first device-management service), the EMM system 370 can be considered a second EMM provider (or second device-management service, respectively). The EMM system 370 can include an EMM server 340, such as a management server. Referencing FIG. 4, the EMM server 340 can be considered the "New EMM" provided in that drawing. The EMM server 340 can also include a console at which an administrator of the customer 310 registers and requests migration of the devices 320. The illustrated servers 340, 350 and databases 360 of the EMM system 370 can be implemented by one or more servers or other computing devices, together or separately.

After the customer 310 registers at the EMM server 340 and requests migration, the EMM server 340 can establish communication with the enterprise service 330. The EMM server 340 can then configure an Enterprise ID for the enterprise service 330 that matches the EMM system 370 and request user details and server details from the enterpriser service 330. Upon receiving the requested information, the EMM server 340 can store the user details and server details at a migration server 350 or a database 360, or both. The migration server 350 and database 360 can be considered part of the EMM system 370 in some examples.

The EMM server 340 can also communicate with the enterprise service 330 to request installation of an agent application on the devices 320 to be migrated. After the agent application is installed and operational on the devices 320, it can interface with the EMM server 340 or migration server 350, or both, to perform enrollment steps. The migration server 350 can confirm user details at the database 360 before proceeding with enrollment, as described above.

Figure 6A:
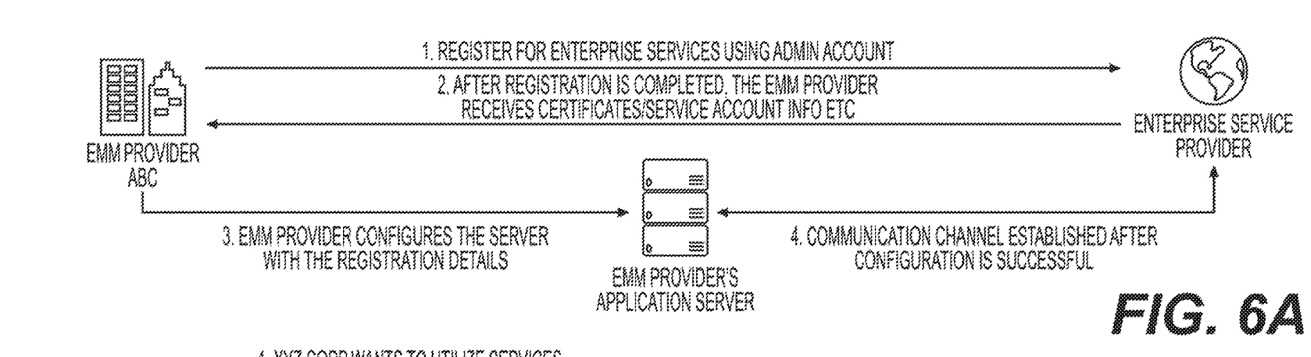
FIG. 6A is an illustration of a portion of an exemplary method for migrating a group of user devices from one device-management service to another.

FIG. 6A illustrates a portion of an exemplary method for migrating a group of user devices from one device-management service to another. In particular, FIG. 6A illustrates an EMM provider registering with an enterprise service provider. The EMM provider "ABC" of FIG. 6A is referred to throughout this disclosure as the "first device-management service" or "old EMM provider." This portion of the method can occur before the stages described above with respect to FIGS. 1-4, for example.

At stage 1 of FIG. 6A, the EMM provider registers for enterprise services using an administrative account. In some examples, the enterprise service provider is GOOGLE, and the registration is performed using an ANDRIOD FOR WORK account. At stage 2, after registration is completed, the EMM provider receives certificates, service account information, and any other account information associated with the enterprise service provider account. This can include, for example, receiving details regarding setting up an application server at the EMM provider at which the enterprise service provider can interface.

At stage 3, the EMM provider can configure that server using the registration details obtains at stage 2. At stage 4, a communication is established between the enterprise service provider and the EMM provider's application server.

Figure 6B:
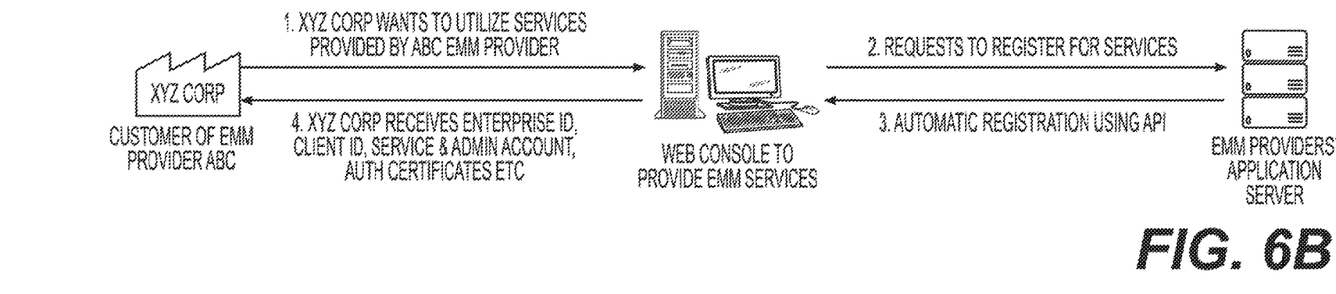
FIG. 6B is an illustration of a portion of an exemplary method for migrating a group of user devices from one device-management service to another.

In FIG. 6B, the old EMM provider registers with the enterprise service provider to provide enterprise services. In the example where the enterprise service provider is GOOGLE, the old EMM provider registers with GOOGLE to provide ANDRIOD ENTERPRISE SERVICES. At stage 1 of FIG. 6B, a customer identified as "XYZ Corp" indicates that it wants to utilize services provided by the old EMM provider. At a web console associated with the EMM provider, XYZ Corp can request to register for enterprise services at stage 2. The request can be made at the EMM provider's application server, which was associated with the enterprise service provider in FIG. 6A.

At stage 3, the EMM provider's application server can perform automatic registration using, for example, a GOOGLE API. In other cases, the registration can be done manually. At stage 4, XYZ Corp receives various information associated with the enterprise services, including an Enterprise ID, Client ID, service or administrator account information, and various credentials.

Figure 6C:
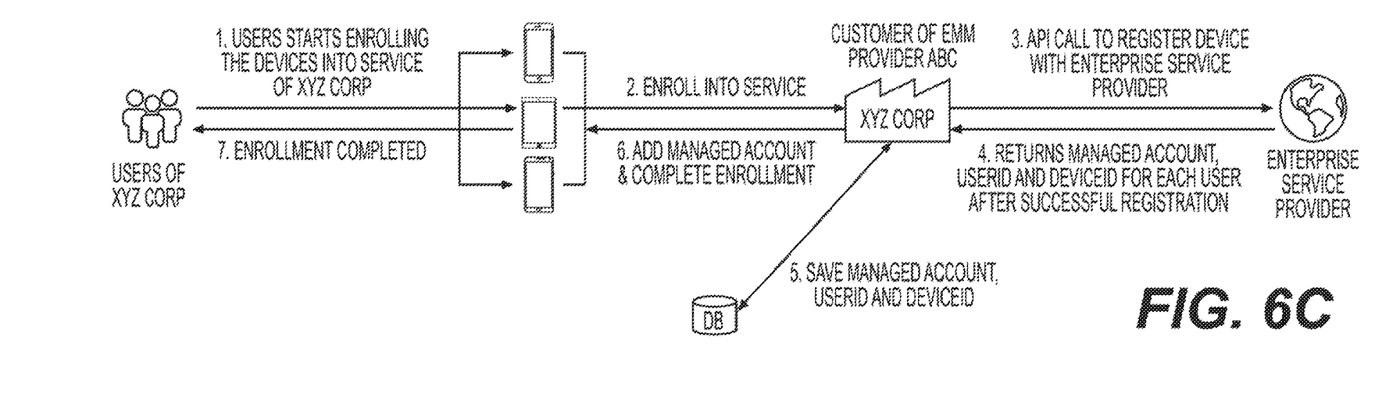
FIG. 6C is an illustration of a portion of an exemplary method for migrating a group of user devices from one device-management service to another.

FIG. 6C is an example flowchart of the employees of XYZ Corp enrolling into the enterprise services offered by the old EMM provider. At stage 1, the users can begin the process of enrolling their devices into the enterprise service such as ANDRIOD ENTERPRISE. The process continues at stage 2. At stage 3, XYZ Corp can use one or more API calls to register the users' devices with the enterprise service provider. The enterprise service provider returns information to XYZ Corp at stage 4 as a result of successful registration of a device. For example, if GOOGLE is the enterprise service provider, it can return a GOOGLE managed account identifier, a GoogleUserID, a GoogleDeviceID, or some combination thereof, for each successfully registered device. The information can be saved to a databased at stage 5. At stage 6, XYZ Corp can add the registered devices to the managed account and complete enrollment at stage 7, which may include installing management software on the devices.

Figure 6D:
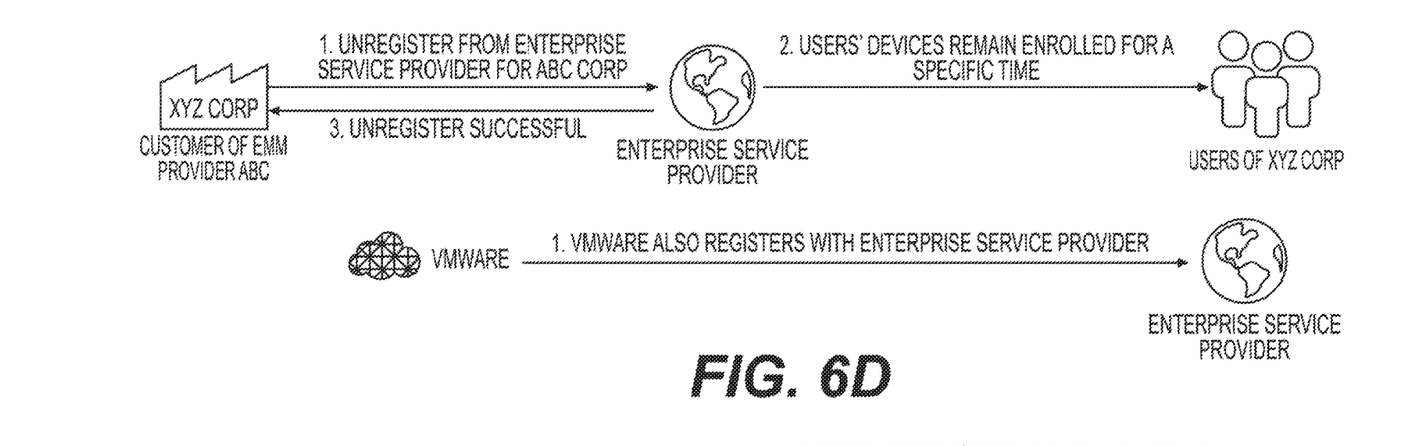
FIG. 6D is an illustration of a portion of an exemplary method for migrating a group of user devices from one device-management service to another.

In the example of FIG. 6D, XYZ Corp has decided to migrate to a new EMM provider—in this example, VMWARE. The examples described above with respect to FIGS. 1-5 include stages that relate to this migration process. In FIG. 6D, at stage 1 XYZ Corp unregisters from the enterprise service provider. The users' devices can remain enrolled at stage 2 even after the account was unregistered. In some examples, the user's devices can remain enrolled for days, weeks, or months, unless further action is taken. At stage 3, XYZ Corp receives confirmation of successfully unregistering from the enterprise service provider. In a parallel stage 1, the new EMM provider (here, VMWARE), registers with the enterprise service provider using similar steps to those described in FIG. 6A.

Figure 6E:
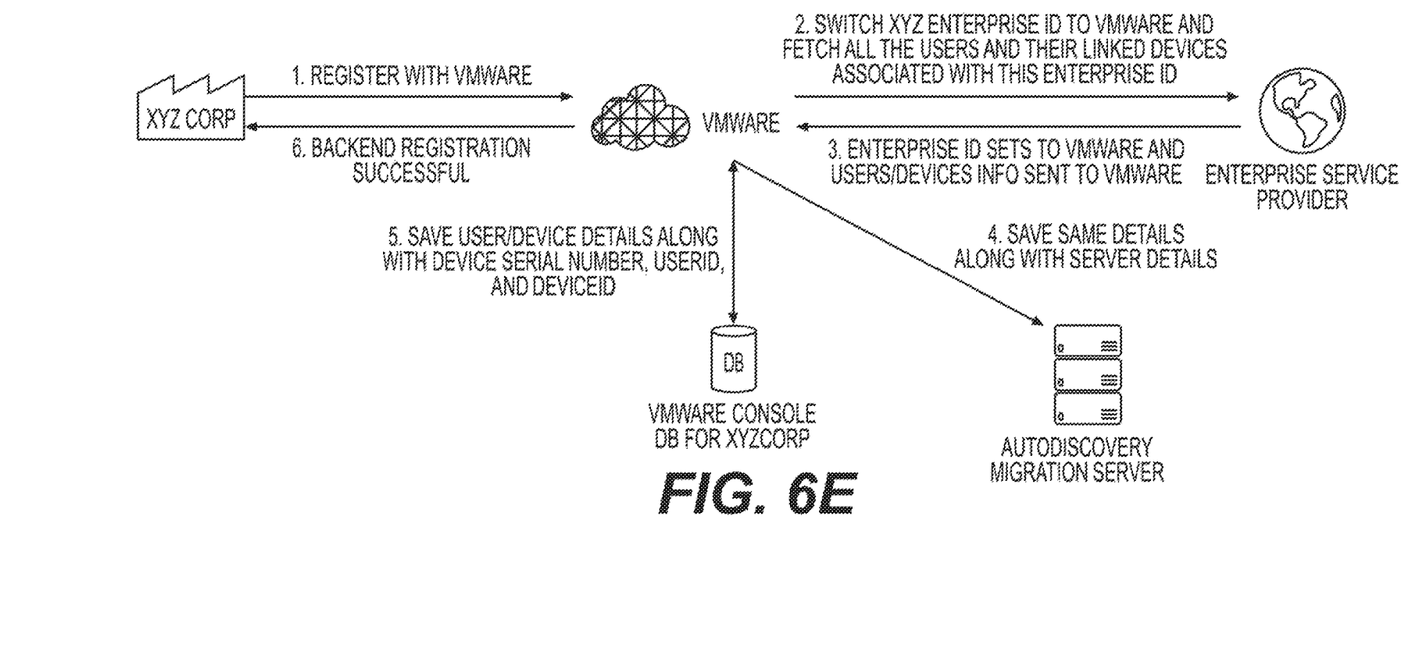
FIG. 6E is an illustration of a portion of an exemplary method for migrating a group of user devices from one device-management service to another.

Turning to FIG. 6E, information is fetched from the enterprise service provider such that the new EMM provider can take over the administration of the enterprise services. At stage 1, XYZ Corp registers with the new EMM provider. The new EMM provider then contacts the enterprise service provider at stage 2. The new EMM provider can replace the old EMM provider's Enterprise ID, previously associated with the enterprise service account, to a new Enterprise ID associated with the new EMM provider. The enterprise service provider can set the new Enterprise ID at stage 3 and send information regarding the users and devices associated with the enterprise account (such as device serial numbers, User IDs, and Device IDs). Some or all of these details can be saved at an auto-discovery migration server at stage 4, a database at stage 5, or a combination of both. A success message can be returned to XYZ Corp at stage 6.

Figure 6F:
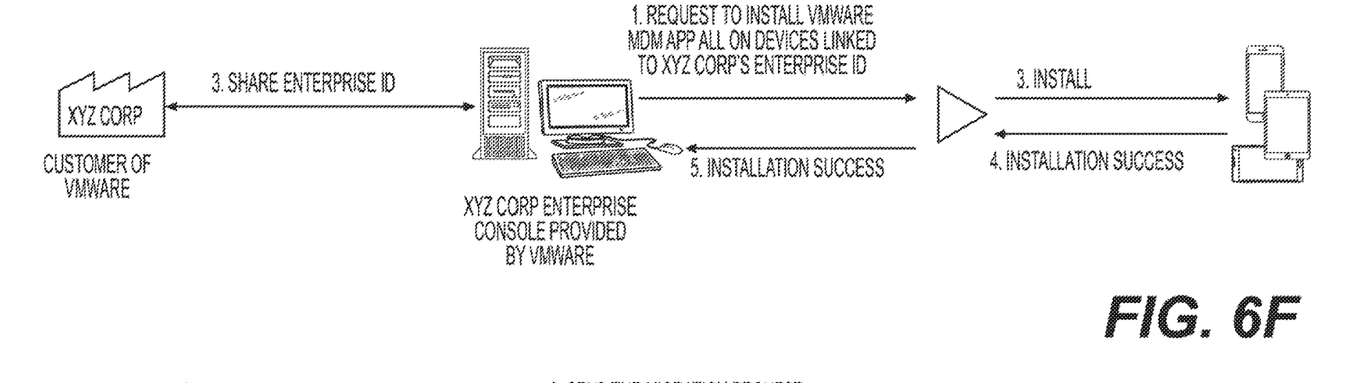
FIG. 6F is an illustration of a portion of an exemplary method for migrating a group of user devices from one device-management service to another.

As illustrated in the example of FIG. 6F, a management application associated with the new EMM provider can be installed on the XYZ Corp devices. At stage 1, XYZ Corp requests installation using the new EMM provider's console. The request can specify a particular application available at, for example, an online storefront associated with the enterprise service provider. For example, the online storefront can be a GOOGLE PLAY store or a GOOGLE PLAY FOR WORK store. The instruction can be sent to the enterprise service provider, instructing it to install the management application across all devices linked to XYZ Corp's Enterprise ID. The installation can be pushed through the online store at stage 3, and return a success indication at stages 4 and 5.

Figure 6G:
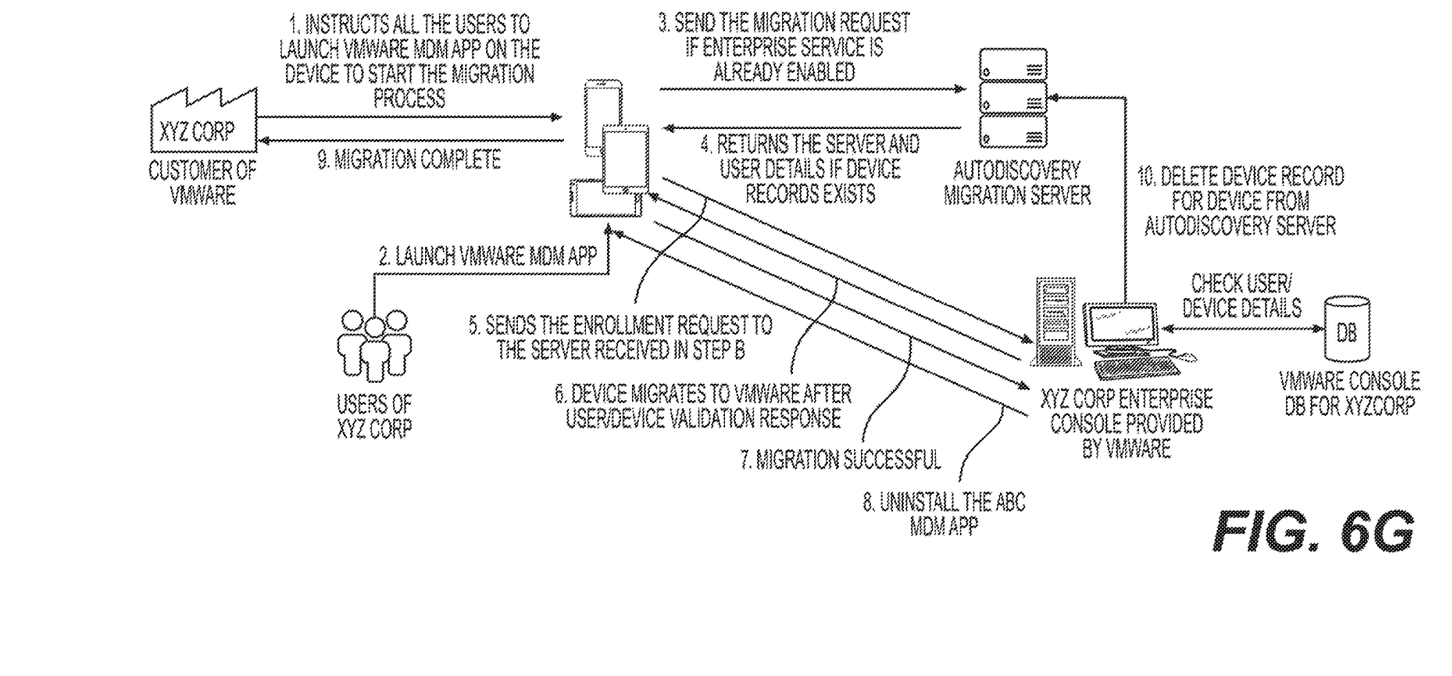
FIG. 6G is an illustration of a portion of an exemplary method for migrating a group of user devices from one device-management service to another.

FIG. 6G is an example flowchart showing the completion of the migration process. At stage 1, XYZ Corp can instruct its users to launch the management application downloaded at FIG. 6F. The users can launch the application at stage 2. At stage 3, a migration request is sent to the auto-discovery migration server if the enterprise service, such as ANDRIOD ENTERPRISE, is already enabled for the device. The migration server cross references its stored records and provides server and user details back to the requesting device. The device can then follow through at stage 5 based on those details, sending an enrollment request through a console provided by the new EMM provider. At stage 6, the device migrates to the new EMM provider after the user and device is validated by checking the records stored in a database. At stage 7, a success indication is provided by the device to the new EMM provider.

The console can then instruct the device to uninstall any software relating to the old EMM provider at stage 8. Stage 9 can include providing a notice to XYZ Corp that the migration is completed. Meanwhile, at stage 10, the new EMM provider can delete device records for the migrated device from the auto-discovery server, as that server need only retain that information for the migration process. At that point, the device is migrated to the new EMM provider, with new management software on the device associated with the new EMM provider, and without any management software relating to the old EMM provider.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for migrating a group comprising a plurality of user devices associated with an enterprise and utilizing an enterprise support service, from a first device-management service to a second device-management service, comprising:
  receiving a request to migrate the group of user devices from the first device-management service to the second device-management service;
  associating the enterprise support service with the second device-management service, wherein associating comprises:
    receiving authentication credentials for an enterprise account for managing the group of user devices in response to the request to migrate, wherein the enterprise account was previously associated with the first device-management service;
    accessing the enterprise account;
    configure the enterprise account to be associated with the second device-management service; and
    receiving user details from the enterprise support service and storing them at a migration server, wherein the user details include corresponding User IDs and Device IDs for the user devices in the group;
  causing the enterprise support service to install an agent application on the plurality of user devices in the group, wherein the agent application provides management functionality for the plurality of user devices; and
  removing one or more applications, associated with the first-device management service, from the user devices in the group.

2. The method of claim 1, wherein associating the enterprise account with the second device-management service further comprises linking an Enterprise ID of the enterprise to the second device-management service.

3. The method of claim 1, wherein associating the enterprise account with the second device-management service further comprises importing enterprise settings associated with the first device-management service to be used with the second device-management service.

4. The method of claim 1, wherein causing the enterprise support service to install an agent application further comprises:
  receiving a request for the agent application to enroll with the second device-management service, the request including information identifying the device;
  confirming that the information identifying the device matches the user details stored at the migration server;
  in response to determining that the information matches the user details, providing the device with information for enrolling with the second device-management service; and
  enrolling the device in the second device-management service.

5. The method of claim 1, further comprising informing a user of the device to launch the agent application after the agent application is installed on the device.

6. The method of claim 1, further comprising creating a field stored at the migration server that indicates whether the migration from the first device-management service to the second device-management service is complete.

7. A non-transitory, computer-readable medium comprising instructions that, when executed by a processor of a computing device, perform stages for migrating a group comprising a plurality of user devices, associated with an enterprise and utilizing an enterprise support service, from a first device-management service to a second device-management service, the stages comprising:
  receiving a request to migrate the group of user devices from the first device-management service to the second device-management service;
  associating the enterprise support service with the second device-management service, wherein associating comprises:
    receiving authentication credentials for an enterprise account for managing the group of user devices in response to the request to migrate, wherein the enterprise account was previously associated with the first device-management service;
    accessing the enterprise account;
    configure the enterprise account to be associated with the second device-management service; and
    receiving user details from the enterprise support service and storing them at a migration server, wherein the user details include corresponding User IDs and Device IDs for the user devices in the group;
  causing the enterprise support service to install an agent application on the plurality of user devices in the group, wherein the agent application provides management functionality for the plurality of user devices; and
  removing one or more applications, associated with the first-device management service, from the user devices in the group.

8. The non-transitory, computer-readable medium of claim 7, wherein associating the enterprise account with the second device-management service further comprises linking an Enterprise ID of the enterprise to the second device-management service.

9. The non-transitory, computer-readable medium of claim 7, wherein associating the enterprise account with the second device-management service further comprises importing enterprise settings associated with the first device-management service to be used with the second device-management service.

10. The non-transitory, computer-readable medium of claim 7, wherein causing the enterprise support service to install an agent application further comprises:
  receiving a request for the agent application to enroll with the second device-management service, the request including information identifying the device;
  confirming that the information identifying the device matches the user details stored at the migration server;
  in response to determining that the information matches the user details, providing the device with information for enrolling with the second device-management service; and
  enrolling the device in the second device-management service.

11. The non-transitory, computer-readable medium of claim 7, the stages further comprising informing a user of the device to launch the agent application after the agent application is installed on the device.

12. The non-transitory, computer-readable medium of claim 7, the stages further comprising creating a field stored at the migration server that indicates whether the migration from the first device-management service to the second device-management service is complete.

13. A system for migrating a group comprising a plurality of user devices, associated with an enterprise and utilizing an enterprise support service, from a first device-management service to a second device-management service, comprising:
  a memory storage including a non-transitory, computer-readable medium comprising instructions; and
  a computing device including a processor that executes the instructions to carry out stages comprising:

receiving a request to migrate the group of user devices from the first device-management service to the second device-management service;

associating the enterprise support service with the second device-management service, wherein associating comprises:
- receiving authentication credentials for an enterprise account for managing the group of user devices in response to the request to migrate, wherein the enterprise account was previously associated with the first device-management service;
- accessing the enterprise account;
- configure the enterprise account to be associated with the second device-management service; and
- receiving user details from the enterprise support service and storing them at a migration server, wherein the user details include corresponding User IDs and Device IDs for the user devices in the group;

causing the enterprise support service to install an agent application on the plurality of user devices in the group, wherein the agent application provides management functionality for the plurality of user devices; and removing one or more applications, associated with the first-device management service, from the user devices in the group.

14. The system of claim 13, wherein associating the enterprise account with the second device-management service comprises linking an Enterprise ID of the enterprise to the second device-management service.

15. The system of claim 13, wherein associating the enterprise account with the second device-management service comprises importing enterprise settings associated with the first device-management service to be used with the second device-management service.

16. The system of claim 13, wherein causing the enterprise support service to install an agent application further comprises:
- receiving a request for the agent application to enroll with the second device-management service, the request including information identifying the device;
- confirming that the information identifying the device matches the user details stored at the migration server;
- in response to determining that the information matches the user details, providing the device with information for enrolling with the second device-management service; and
- enrolling the device in the second device-management service.

17. The system of claim 13, the stages further comprising creating a field stored at the migration server that indicates whether the migration from the first device-management service to the second device-management service is complete.

* * * * *